March 23, 1937. G. B. NICHOLS 2,074,485
TUBE SPLICING METHOD
Filed March 28, 1931 4 Sheets-Sheet 1

INVENTOR
George B. Nichols

ATTORNEYS

March 23, 1937. G. B. NICHOLS 2,074,485
TUBE SPLICING METHOD
Filed March 28, 1931 4 Sheets-Sheet 2

INVENTOR
George B. Nichols

ATTORNEYS

March 23, 1937. G. B. NICHOLS 2,074,485
TUBE SPLICING METHOD
Filed March 28, 1931 4 Sheets-Sheet 3
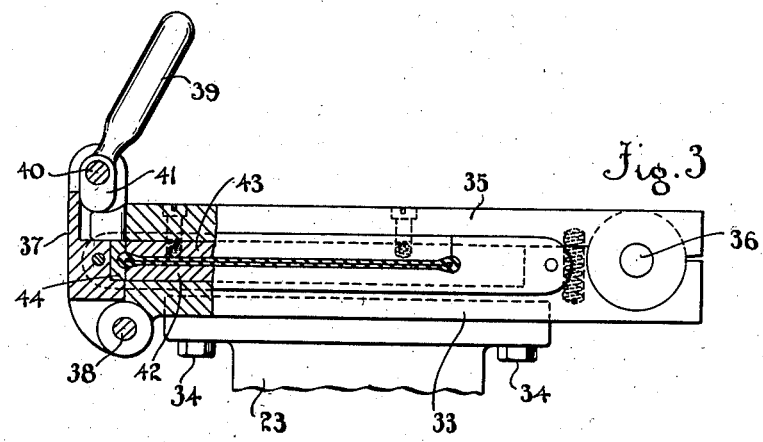
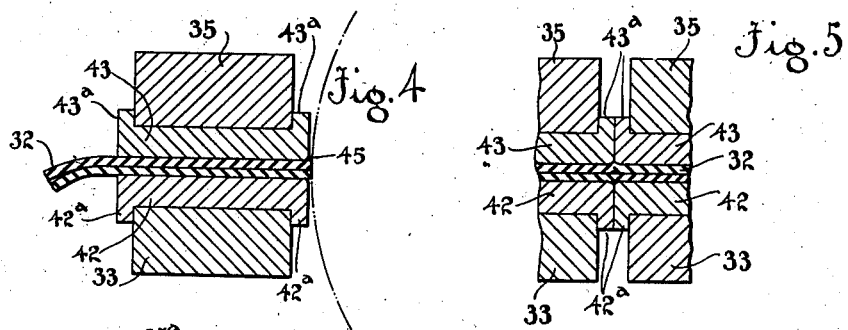
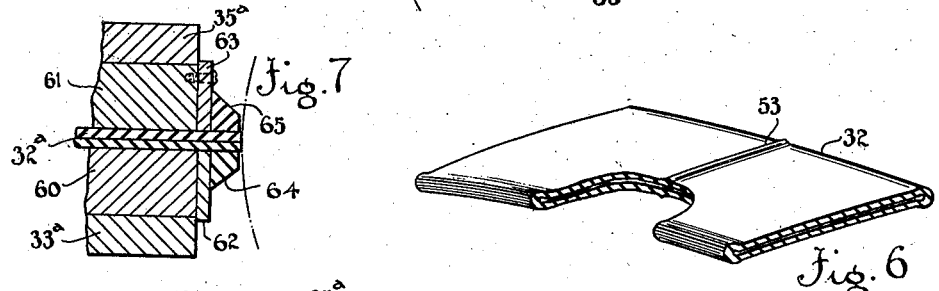
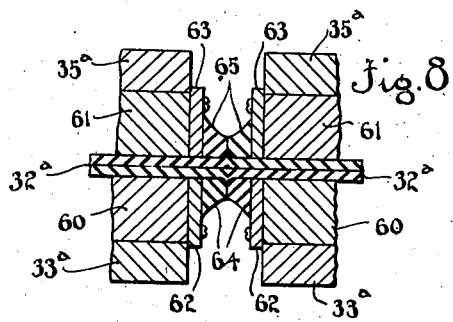
INVENTOR
George B. Nichols
BY
ATTORNEYS March 23, 1937. G. B. NICHOLS 2,074,485
TUBE SPLICING METHOD
Filed March 28, 1931  4 Sheets-Sheet 4
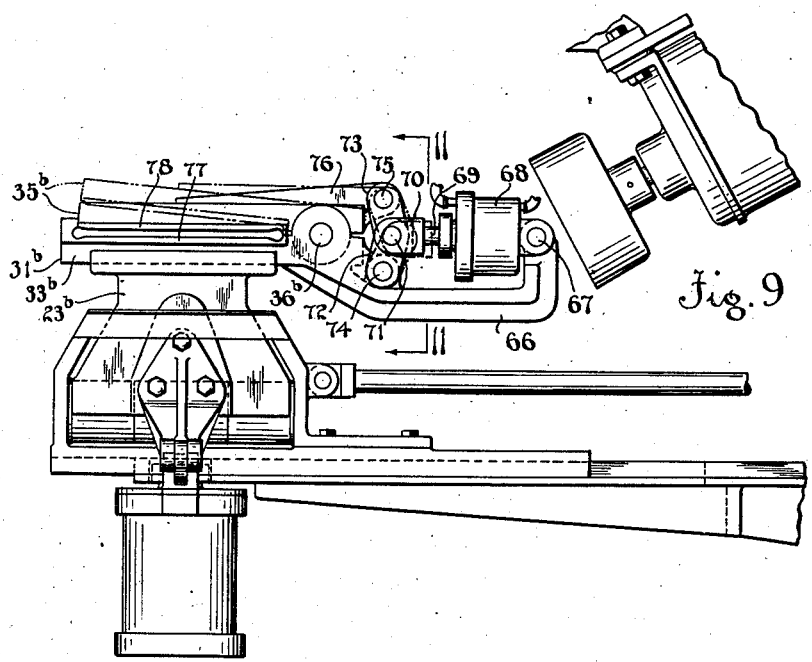
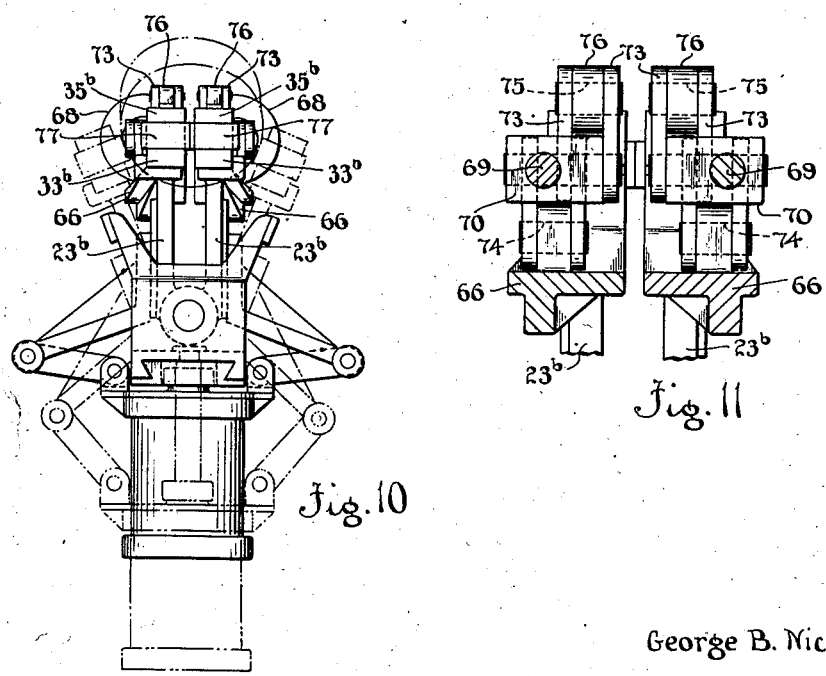
INVENTOR
George B. Nichols
BY
ATTORNEYS Patented Mar. 23, 1937

2,074,485

UNITED STATES PATENT OFFICE 2,074,485

TUBE SPLICING METHOD

George B. Nichols, Akron, Ohio, assignor to The Firestone Tire & Rubber Company, Akron, Ohio, a corporation of Ohio Application March 28, 1931, Serial No. 526,020

1 Claim. (Cl. 154—14)

This invention relates to tube splicing methods and apparatus, and more especially it relates to procedure and mechanism for butt-splicing tubes of plastic unvulcanized rubber composition, such as inner tubes for pneumatic tires.

The chief objects of the invention are to provide improved spliced tubes; and to provide improved procedure and improved apparatus for making such tubes. Other objects will be manifest as the specification proceeds.

Of the accompanying drawings:

Figure 3 is a detail elevation of one of the work-supporting members, and the work therein, parts being in section.

Figure 4 is a sectional detail view through one of the work-supporting members, and the work therein, on an enlarged scale.

Figure 5 is a sectional detail view through two work-supporting members, and the work therein showing the splicing of the latter.

Figure 6 is a sectional perspective view of a portion of the finished work, a part being broken away.

Figure 7 is a sectional detail view through a work-supporting member of modified construction, and the work therein.

Figure 8 is a sectional detail view through two of the modified work-supporting members, and the work therein showing the splicing of the latter.

Figure 9 is a fragmentary side elevation of a modified form of the apparatus comprising mechanically operated work supports.

Figure 10 is an end elevation of the apparatus shown in Figure 9 as viewed from the left thereof.

Figure 11 is a section on the line 11—11 of Figure 9.

Figure 1:
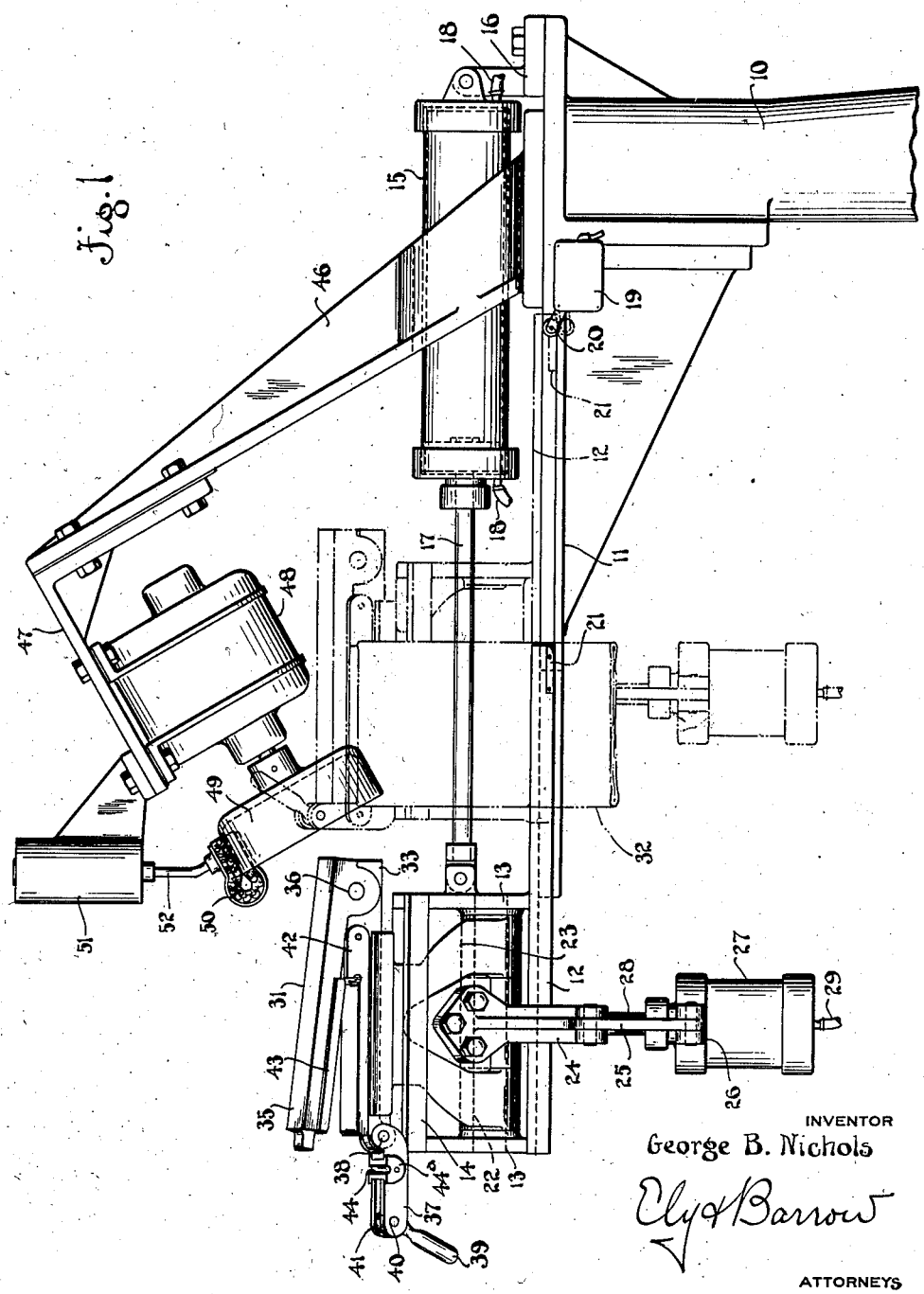
Figure 1 is a side elevation of an illustrative embodiment of the invention, in its preferred form, in inoperative position.

Referring to the drawings, 10 is a pedestal support upon which is mounted a bracket 11 that extends laterally from the top of the pedestal, said bracket having its upper face formed with a dove-tail slideway in which rides a slide or carriage 12 which may project beyond the free end of the bracket. The slide 12 is formed at its outer end with a pair of upright walls 13, 13 which are spaced apart longitudinally of the slide and are connected to each other by reinforcing strips 14 on opposite sides of the slide. A double-acting fluid pressure cylinder 15 is mounted at one end upon a bracket 16 on the top of the pedestal 10 and has its piston rod 17 connected to the near wall 13 of the slide 12, the arrangement being such as to permit reciprocation of the slide 12 from the full line position shown in Figure 1 to the broken line position of the same figure. Preferably the fluid inlet-and-outlet pipes 18, 18 of the cylinder 15 communicate with a solenoid-operated three-way operating valve (not shown) and a switch 19 in the electrical circuit of the solenoid is mounted upon the pedestal 10, and has an operating lever 20 in the path of a cam or lug 21 mounted upon the end of the slide 12, the arrangement providing means for automatically effecting the return or outward movement of the slide after it has moved inward upon manual actuation of the solenoid switch.

A shaft 22 is mounted upon the slide 12 with its ends secured in the respective walls 13 thereof, and a pair of plates 23, 23 are journaled or hinged upon said shaft, and in normal inoperative position rest against the respective reinforcing strips 14. Projecting from the outer face of each plate 23 is a lever arm 24, the free end of which is connected by a link 25 to a yoke or end-casting 26 of a double-acting fluid pressure cylinder 27. The latter is positioned below the slide 12 and is suspended therefrom by its piston rod 28, and fluid inlet-and-outlet pipes 29, 29 communicate with the cylinder chamber at opposite sides of the piston 30 thereof, the arrangement being such that the admission of pressure fluid to either end of the cylinder causes it to move up or down along its piston rod, with the result that the plates 23 are moved together or apart, the alternative positions of the respective parts being best shown in Figure 2.

Mounted upon the upper edge of the plates 23 are respective work-holding clamps 31, 31 which are identical in structure so that a detail description of one will suffice for both. The work to be treated consists of a length of unvulcanized rubber tubing 32 which preferably is produced by an extruding machine and has the natural flat shape shown in the drawings, there being sufficient lubricant, such as soapstone dust, upon the interior face of the tube to prevent adhesion of its flattened walls. However, the apparatus is not limited to the splicing of extruded tubes, and may be advantageously used for splicing tubes produced by other known methods.

Each work-holding clamp 31 comprises a lower die-holder 33 secured to the plate 23 by bolts 34, 34, an upper die-holder 35 hinged at 36 to the lower die-holder 33 at one end thereof, a latch 37 hinged at 38 to the opposite end of the lower die-holder, and a latch-lever 39 pivotally mounted on the latch at 40 and provided with a cam portion 41 adapted to engage the free end of the upper die-holder 35 for forcing the latter toward the lower die-holder. The upper and lower die-holders 33, 35 and the latch 37 are suitably recessed to receive respective die-sections 42, 43, and 44 which are formed with respective lateral flanges 42ª, 43ª and 44ª that lie on the lateral faces of the die-holders and latch, and the die sections are suitably recessed to receive and closely confine the flattened tube 32. As shown at 45 in Figures 4 and 5, the inner corner of the work-receiving recess in the die sections is slightly rounded.

Mounted upon the bracket 11 over the pedestal 10 is an inclined or overhanging bracket 46 to the upper end of which is secured a bracket 47 on which is mounted a motor 48, the latter depending from the under side of the bracket 47 and being obliquely disposed with relation to the horizontal. One end of the motor shaft, the lower end as viewed in Figure 1, carries a cup-shaped cutter 49, having a sharp peripheral margin, and a moistening swab 50 embraces the respective sides of the cutting edge of the cutter for applying a suitable rubber solvent, such as gasoline, thereto.

The solvent is stored in a reservoir 51 which is supported upon the bracket 47, and a tube 52 conducts the solvent from the reservoir to the swab.

Figure 2:
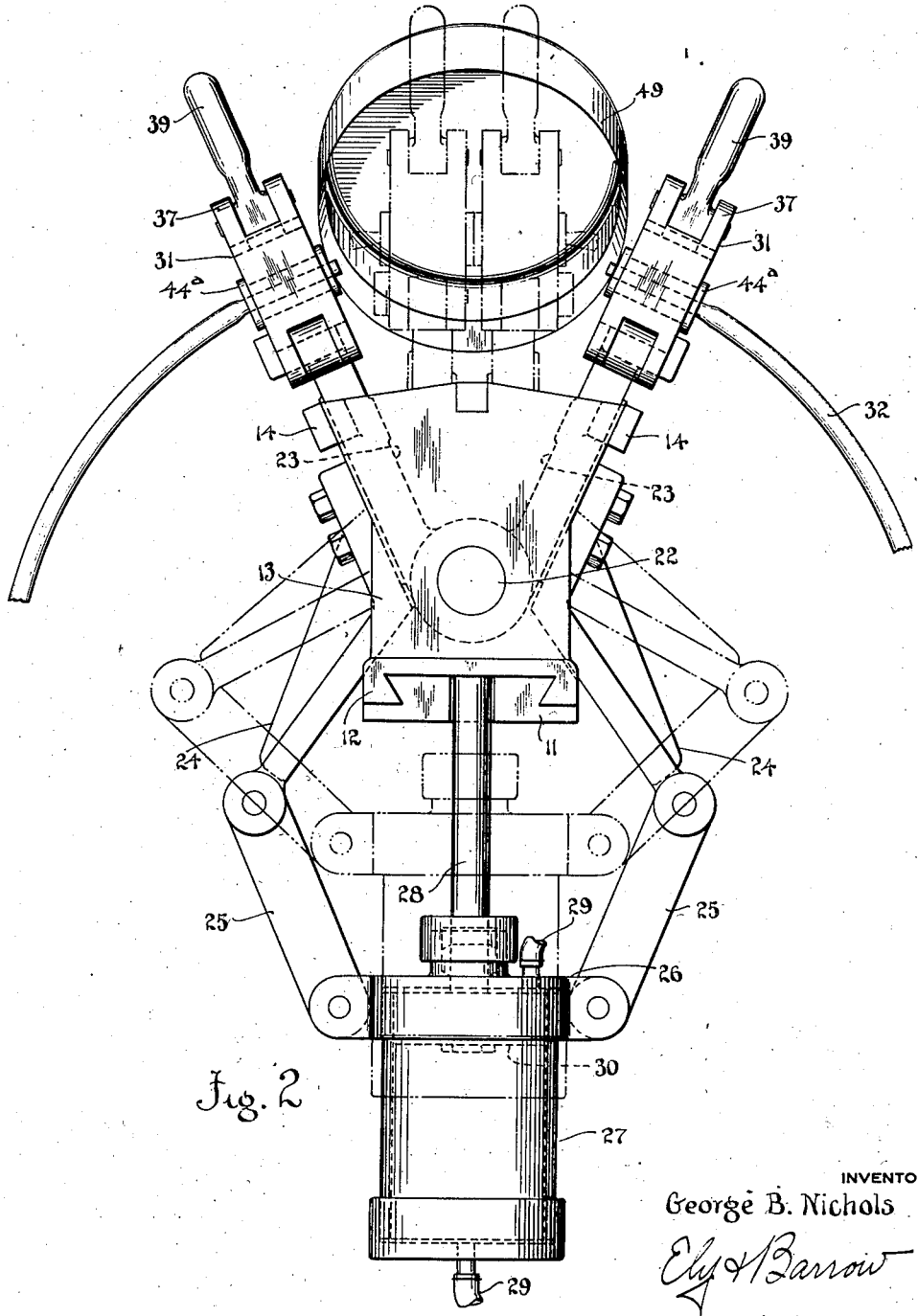
Figure 2 is a front elevation of the apparatus, as viewed from the left of Figure 1.

In the operation of the apparatus, the parts occupy the inoperative positions shown in full lines in Figure 1, preferably with the motor constantly running. A length of flattened rubber tubing 32 constituting the work is mounted in the device by clamping its respective end portions in the respective clamps 31, the ends of the tube projecting slightly beyond the inner lateral faces of the die sections, as is shown in Figure 2. The forward end of the cylinder 15 is then charged to move the slide 12 to the right as viewed in Figure 1, with the result that the end portions of the tube 32 are carried past the cutter 49 and severed close to the die-flanges 42ª, 43ª, leaving but a few thousandths of an inch of tube projecting therefrom. As soon as the slide 12 and mechanism thereon reach the position shown in broken lines in Figure 1, the lug 21 on the slide operates the switch lever 20 to automatically reverse the flow of fluid to the cylinder 15, with the result that the slide is moved back to its original, full-line position.

Next, the upper end of the cylinder 27 is charged to cause the cylinder to rise to the broken line position shown in Figure 2 whereby the links 25 and levers 24 are actuated to swing the plates 23 on their pivot 22 toward each other and thereby to bring the work-holders 31 forcibly into juxtaposition. The arrangement is such that the slightly projecting ends of the tube 32 are brought forcibly together in face to face relation as is shown in Figure 5, the rounded portions 45 of the die sections permitting a slight displacement of surplus rubber to form a thickened ridge 53 on the tube over the splice. The freshly cut end-faces of the tube 32 naturally adhere strongly to each other, and the adhesion is further strengthened by the tacky condition of said end-faces caused by the rubber solvent on the cutter 49. The work-holders 31 are then opened, the spliced tube removed therefrom and the operations repeated as described.

Referring now to the modified work-supporting structures shown in Figures 7 and 8, each work-holding clamp comprises a lower die-holder 33ª and an upper die-holder 35ª, which members are mounted and manipulated in the same manner as the corresponding elements of the preferred embodiment. The die-holders 33ª, 35ª, and a latching member (not shown) are suitably recessed to receive respective die sections 60, 61, and the latter are suitably recessed to receive, support, and closely confine the flattened rubber tube 32ª constituting the work. Mounted upon the inner lateral faces of the die sections 60, 61, are respective metal plates 62, 63 which extend like flanges onto the adjacent lateral faces of the die-holders and latch, and the exposed faces of the plates 62, 63 have cushions of resilient rubber 64, 65 respectively adhered or vulcanized to them. Said cushions are trapezoidal in section, having flat work-engaging faces, tapered or oblique opposite faces, and flat lateral faces as shown.

In operation, the work is trimmed or severed close to the lateral faces of the cushions in the same manner as in the preferred embodiment of the apparatus, and then the work-holders are brought toward each other so that the respective ends of the work, and the lateral faces of the respective cushions 64, 65 are brought forcibly together, as is clearly shown in Figure 8. The resilience of the cushions 64, 65 causes them to yield under impact, and thus the end faces of the work are pressed strongly together, and slight displacement outwardly of surplus stock permitted so as to produce a thickened external ridge or seam at the splice. This ridge disappears during the subsequent vulcanization of the work in a mold.

In the modified construction shown in Figures 9, 10, and 11, each work-holding clamp 31ᵇ comprises a lower die-holder 33ᵇ suitably secured to a plate 23ᵇ and an upper die-holder 35ᵇ hinged at 36ᵇ to the lower die-holder at one end thereof. The lower die-holder 33ᵇ is formed with a rearwardly extending arm or bracket 66, the free end of which is upwardly turned, and pivotally attached to said upturned portion at 67 is a double-acting fluid pressure cylinder 68. The pivot 67 and axis of the cylinder 68 are horizontally aligned with the pivot 36ᵇ when the work-holder is closed. The outer end of the piston rod 69 of the cylinder 68 is provided with a yoke 70 that is pivotally connected at 71 to one end of each of a pair of links 72, 73, the other end of the link 72 being pivotally connected at 74 to the bracket 66, and the other end of the link 73 being pivotally connected at 75 to a rearwardly projecting ear 76 formed on the upper die-holder 35ᵇ. Dies 77, 78 are mounted in the respective die-holders 33ᵇ, 35ᵇ.

The arrangement is such that when the front end of the cylinder 68 is charged, retraction of the piston rod 69 causes the upper die-holder 35ᵇ to rise about its pivot 36ᵇ, the respective interconnected parts assuming the positions shown in broken lines in Figure 9 of the drawings. Charging the rear end of the cylinder 68 reverses the movement of the parts and puts them in the positions shown in full lines in the drawings. In other respects this modified apparatus is the same as the preferred embodiment, although the die-holders may be of the modified construction shown in Figures 7 and 8.

Experience has shown that tube splices made in the manner and by the apparatus described are fully as strong as other portions of the tube, and the splice is practically invisible after the tube has been vulcanized in a mold in the usual manner.

Other modifications of the apparatus are possible within the scope of the appended claims, which are not limited wholly to the specific construction shown or exact procedure described.

What is claimed is:

The method of splicing portions of unvulcanized hollow rubber articles which comprises bringing opposite walls of said portions into contact with each other by flattening said portions, removing surface layers from said portions by cutting said flattened portions transversely from one lateral edge thereof progressively toward the other lateral edge to expose clean surfaces therebeneath, the cutting edge being substantially perpendicular to the flattened tube portions, and then bringing said clean surfaces forcibly into face-to-face engagement.

GEORGE B. NICHOLS.